(12) United States Patent
Ra et al.

(10) Patent No.: US 11,281,057 B2
(45) Date of Patent: Mar. 22, 2022

(54) LIQUID CRYSTAL DISPLAY WHICH PREVENTS LIGHT LEAKAGE

(71) Applicant: Samsung Display Co., Ltd., Yongin-Si (KR)

(72) Inventors: Yoo Mi Ra, Ansan-si (KR); Dong Hee Shin, Asan-si (KR); Soo Hong Cheon, Seoul (KR)

(73) Assignee: Samsung Display Co., Ltd.

( * ) Notice: Subject to any disclaimer, the term of this patent is extended or adjusted under 35 U.S.C. 154(b) by 128 days.

(21) Appl. No.: 16/375,604

(22) Filed: Apr. 4, 2019

(65) Prior Publication Data

US 2020/0064697 A1 Feb. 27, 2020

(30) Foreign Application Priority Data

Aug. 24, 2018 (KR) .................. 10-2018-0099348

(51) Int. Cl.
| | |
|---|---|
| *G02F 1/1333* | (2006.01) |
| *G02F 1/1362* | (2006.01) |
| *G02F 1/1343* | (2006.01) |
| *G02F 1/1339* | (2006.01) |
| *G02F 1/1335* | (2006.01) |
| *G02F 1/1345* | (2006.01) |
| *G02F 1/1368* | (2006.01) |

(52) U.S. Cl.
CPC ...... *G02F 1/136204* (2013.01); *G02F 1/1339* (2013.01); *G02F 1/1345* (2013.01); *G02F 1/13394* (2013.01); *G02F 1/13439* (2013.01); *G02F 1/133512* (2013.01); *G02F 1/134309* (2013.01); *G02F 1/136286* (2013.01); *G02F 1/1368* (2013.01); *G02F 1/13396* (2021.01); *G02F 1/13398* (2021.01); *G02F 1/133388* (2021.01); *G02F 1/136222* (2021.01); *G02F 2202/22* (2013.01)

(58) Field of Classification Search
CPC ......... G02F 1/136204; G02F 1/133512; G02F 2202/22
See application file for complete search history.

(56) References Cited

U.S. PATENT DOCUMENTS

| | | | | |
|---|---|---|---|---|
| 8,174,661 | B2 * | 5/2012 | Kwak | G02F 1/13394 349/149 |
| 8,460,953 | B2 * | 6/2013 | Tanaka | G02F 1/133512 438/30 |
| 10,642,114 | B2 * | 5/2020 | Guo | G02F 1/136204 |

(Continued)

FOREIGN PATENT DOCUMENTS

| | | |
|---|---|---|
| CN | 105093629 A * | 11/2015 |
| JP | 2839362 B2 | 12/1998 |

(Continued)

*Primary Examiner* — Paisley L Wilson
(74) *Attorney, Agent, or Firm* — Innovation Counsel LLP (57) ABSTRACT

A liquid crystal display according to an exemplary embodiment of the present inventive concept includes: a first substrate including a first electrode; a second substrate including a second electrode and a light blocking layer; and a short-circuit spacer that is disposed between the first substrate and the second substrate, wherein the second electrode is disposed between the second substrate and the light blocking layer, the light blocking layer includes an opening, and the second electrode and the short-circuit spacer contact each other in the opening.

14 Claims, 5 Drawing Sheets

(56) References Cited

U.S. PATENT DOCUMENTS

2018/0052347 A1    2/2018  Yu
2018/0157132 A1*   6/2018  Shim .................. G02F 1/13394

FOREIGN PATENT DOCUMENTS

KR       10-0532543 B1    12/2005
KR       10-1694504 B1     1/2017
KR    10-2018-0037047 A    4/2018

* cited by examiner

LIQUID CRYSTAL DISPLAY WHICH PREVENTS LIGHT LEAKAGE

CROSS-REFERENCE TO RELATED APPLICATION

This application claims priority to and the benefit of Korean Patent Application No. 10-2018-0099348 filed in the Korean Intellectual Property Office on Aug. 24, 2018, the entire contents of which are incorporated herein by reference.

BACKGROUND (a) Technical Field

The present disclosure relates to a liquid crystal display (LCD), and more particularly, it relates to an LCD that can prevent light leakage due to damage to a light emitting layer during cutting of a common electrode.

(b) Description of the Related Art

A liquid crystal display (LCD) includes two display panels including field generating electrodes such as a pixel electrode and a common electrode, and a liquid crystal layer disposed between the two display panels.

The liquid crystal display generates an electric field in the liquid crystal layer by applying a voltage to the field generating electrodes to determine alignment of liquid crystal molecules of the liquid crystal layer through the generated electric field and control polarization of incident light, thereby displaying images.

Static electricity may be introduced from the outside of the liquid crystal display device, and the display device may be damaged when such static electricity is introduced into the display panel.

The above information disclosed in this Background section is only for enhancement of understanding of the background of the inventive concept and therefore it may contain information that does not form the prior art that is already known in this country to a person of ordinary skill in the art.

SUMMARY OF THE INVENTIVE CONCEPT

Exemplary embodiments have been made in an effort to provide a liquid crystal display that can prevent light leakage due to damage to a light blocking layer when a common electrode is cut to prevent introduction of static electricity.

A liquid crystal display according to an exemplary embodiment of the present inventive concept includes: a first substrate including a first electrode; a second substrate including a second electrode and a light blocking layer; and a short-circuit spacer that is disposed between the first substrate and the second substrate, wherein the second electrode is disposed between the second substrate and the light blocking layer, the light blocking layer includes an opening, and the second electrode and the short-circuit spacer contact each other in the opening.

The first substrate may include a display area and a non-display area and may further include a common voltage transmission line that may be disposed in the non-display area of the first substrate and contact the short-circuit spacer.

A voltage supplied to the common voltage transmission line may be transmitted to the second electrode through the short-circuit spacer.

The second substrate may include a display area and a non-display area, and the short-circuit spacer may be disposed in the non-display area.

The second electrode disposed in the non-display area may include a cut line which is a disconnected portion of the second electrode.

The cut line may be disposed to overlap the short-circuit spacer.

The cut line may be disposed farther away from the display area than the short-circuit spacer.

The liquid crystal display may further include a column spacer that is disposed in a non-display area between the first substrate and the second substrate.

The column spacer may contact the light blocking layer.

The column spacer may not contact the second electrode.

A liquid crystal display according to another exemplary embodiment of the present inventive concept includes: a first substrate that includes a first electrode; and a second substrate that includes a second electrode and a light blocking layer, wherein the second electrode is disposed between the second substrate and the light blocking layer, the second substrate includes a display area and a non-display area, the light blocking layer disposed in the non-display area includes an opening, the second electrode disposed in the non-display area includes a cut line which is a disconnected portion of the second electrode.

A short-circuit spacer may be disposed in the non-display area between the first substrate and the second substrate, and the second electrode and the short-circuit spacer may contact each other in the opening.

The first substrate may include a display area, a non-display area, and a common voltage transmission line that may be disposed in the non-display area of the first substrate and contact the short-circuit spacer.

A voltage supplied to the common voltage transmission line is transmitted to the second electrode through the short-circuit spacer.

The cut line may be disposed to overlap the short-circuit spacer.

The cut line may be disposed farther away from the display area than the short-circuit spacer.

The liquid crystal display may further include a column spacer that is disposed in the non-display area between the first substrate and the second substrate.

The column spacer may contact the light blocking layer.

The column spacer may not contact the second electrode.

The liquid crystal display may further include a clock signal line that is disposed in the non-display area of the first substrate, wherein the clock signal line may be disposed to overlap the column spacer wherein the clock signal line is disposed to overlap the column spacer.

According to the exemplary embodiments, the light blocking layer can be prevented from being damaged when the common electrode is cut for prevention of introduction of static electricity, thereby preventing a light leakage.

DETAILED DESCRIPTION OF THE EMBODIMENTS

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

Parts that are irrelevant to the description will be omitted in the drawings to clearly describe the present inventive concept, and the same or similar constituent elements will be designated by the same reference numerals throughout the specification.

Since the size and the thickness of each configuration shown in the drawings are arbitrarily indicated for better understanding and ease of description, the present inventive concept is not limited to as shown in the drawings, and the thickness of layers, films, panels, regions, etc., are exaggerated for clarity. In the drawings, the thickness of layers, films, panels, regions, etc., are exaggerated for clarity. In addition, thickness of some layers and regions are exaggerated in the drawings for convenience of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

In addition, in this specification, the phrase "on a plane" means viewing a target portion from the top, and the phrase "on a cross-section" means viewing a cross-section formed by vertically cutting a target portion from the side.

Hereinafter, a liquid crystal display (LCD) according to an exemplary embodiment of the present inventive concept will be described in detail with reference to the accompanying drawings.

Figure 1:
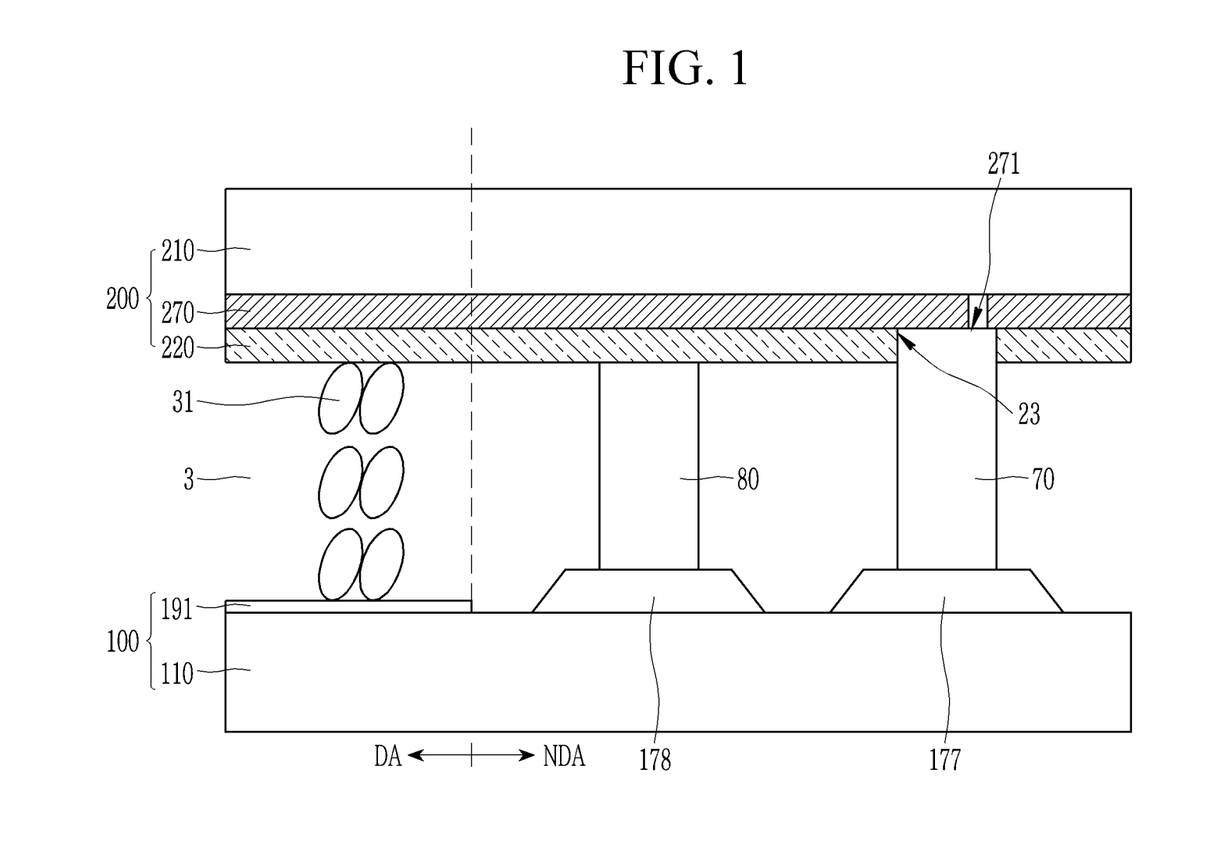
FIG. 1 is a cross-sectional view that schematically illustrates a liquid crystal display according to an exemplary embodiment of the present inventive concept.

FIG. 1 is a schematic cross-sectional view of an LCD according to an exemplary embodiment of the present inventive concept. Referring to FIG. 1, an LCD according to the present exemplary embodiment includes a first display panel 100, a second display panel 200, and a liquid crystal layer 3 that is disposed between the first display panel 100 and the second display panel 200. The first display panel 100 and the second display panel 200 are disposed to face each other.

The LCD includes a display area DA where the liquid crystal layer 3 including liquid crystal molecules 31 is disposed and thus an image is displayed, and a non-display area NDA where no liquid crystal molecules 31 are included.

The first display panel 100 includes a first substrate 110, and a first electrode 191 that is disposed on the first substrate 110. A clock signal line 178 and a common voltage transmission line 177 may be disposed in the non-display area NDA of the first substrate 110. However, this is an example, and various driving wires that are not illustrated may be disposed in the non-display area NDA.

The second display panel 200 includes a second substrate 210, a second electrode 270, and a light blocking layer 220. The second electrode 270 and the light blocking layer 220 are disposed on the second substrate 210. The second electrode 270 is disposed between the second substrate 210 and the light blocking layer 220. That is, the light blocking layer 220 is located farther away from the second substrate 210 than the second electrode 270.

Referring to FIG. 1, a short-circuit spacer 70 and a column spacer 80 are disposed between the first display panel 100 and the second display panel 200. The short-circuit spacer 70 and the column 80 are disposed in the non-display area NDA of the LCD. However, a plurality of short-circuit spacers 70 may be disposed in the display area DA.

The column spacer 80 may overlap the clock signal line 178, and maintains a cell gap between the first display panel 100 and the second display panel 200. The column spacer 80 may be non-conductive. The short-circuit spacer 70 has conductivity, and makes the common voltage transmission line 177 and the second electrode 270 contact each other. A common voltage transmitted to the common voltage transmission line 177 is transmitted to the second electrode 270 through the short-circuit spacer 70.

The light blocking layer 220 is partially removed, and thus an opening 23 is formed such that the short-circuit spacer 70 and the second electrode 270 contact each other therethrough. That is, a portion of the light blocking layer 220 overlapping the short-circuit spacer 70 is removed and thus the second electrode 270 is exposed therethrough, and the second electrode 270 and the short-circuit spacer 70 contact each other in the portion where the light blocking layer 220 is removed. The opening 23 and the short-circuit spacer 70 may have the same configuration in a plan view. The short-circuit spacer 70 may cover the opening 23 completely.

Referring to FIG. 1, the second electrode 270 includes a cut line 271 which is a disconnected portion of the second electrode 270 to separate the second electrode inside the cut line 270 and the second electrode outside the cut line 270. That is, the second electrode 270 is partially removed and separated while forming the cut line 271.

Consequently, portions of the second electrode 270 that are disposed on opposite sides of the cut line 217 are not connected with each other. In FIG. 1, the cut line 271 is illustrated to be overlapped with the short-circuit spacer 70, but may not be overlapped with the short-circuit spacer 70 depending on exemplary embodiments. However, when the cut line 271 does not overlap the short-circuit spacer 70, the cut line 271 may be disposed farther away from the display area DA than the short-circuit spacer 70.

The cut line 271 prevents external static electricity from flowing into the display area DA of the LCD. When the external static electricity flows into the display area DA through an edge of the LCD, the LCD may be damaged. However, as shown in FIG. 1, the cut line 271 is disposed in the second electrode 270 to completely surround the display area, the external static electricity introduced through the second electrode 270 from the outside cannot be transmitted to the display area DA.

In case of the LCD according to the present exemplary embodiment, the second electrode 270 is disposed closer to the second substrate 210 than the light blocking layer 220. Because, the second electrode 270 is formed and partially removed before the the light blocking layer 220 is formed, damage to the light blocking layer 220 while forming the cut line 271 of the second electrode 270 can be prevented.

Figure 2:
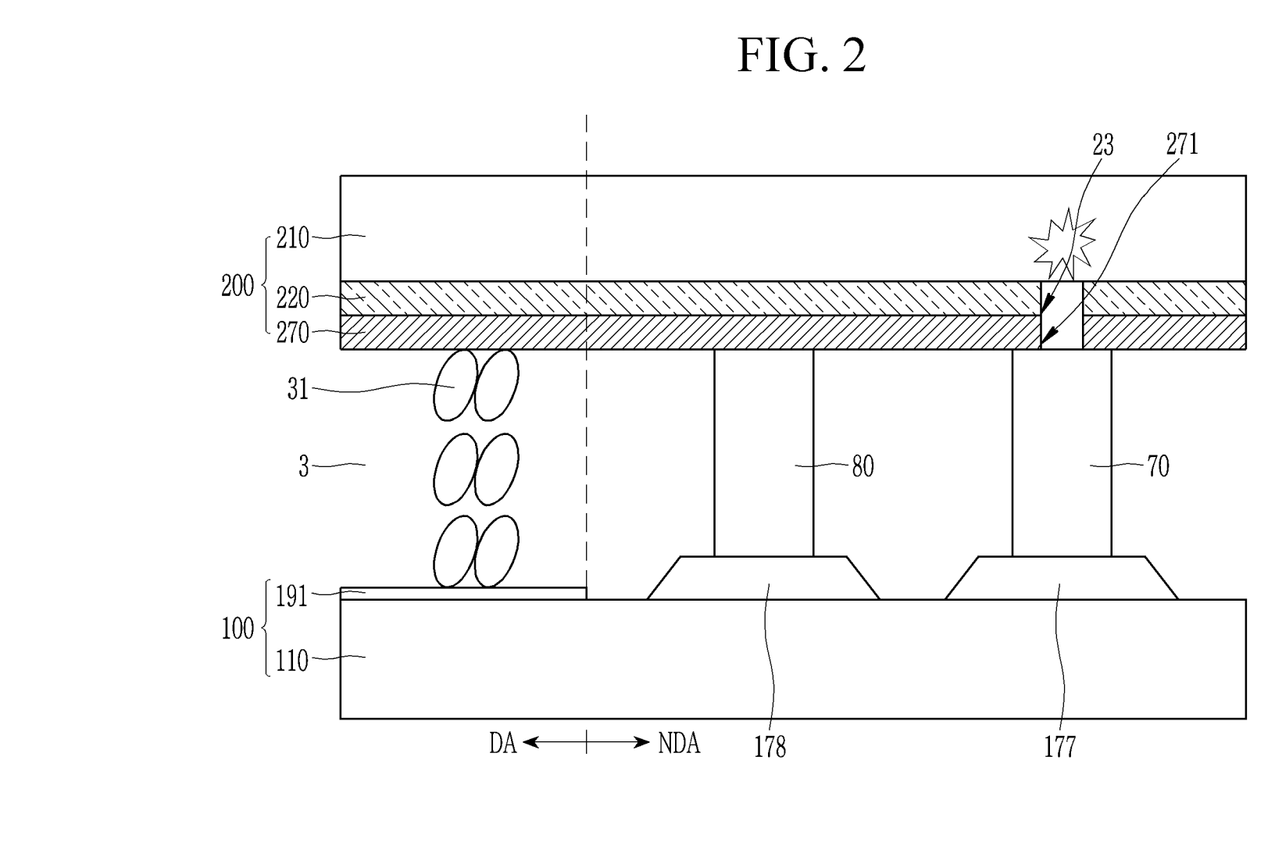
FIG. 2 shows a display according to a comparative example of the present inventive concept.

FIG. 2 shows a display device according to a comparative example of the present inventive concept. The display of FIG. 2 is the same as the LCD of FIG. 1, except for a location of a light blocking layer 220 and a second electrode 270, and therefore a duplicated description will be omitted. Referring to FIG. 2, the light blocking layer 220 is disposed on a second substrate 210 and then the second electrode 270 is disposed thereon. That is, the light blocking layer 220 is disposed between the second substrate 210 and the second electrode 270.

In this case, a part of the light blocking layer 220 is removed while a cut line is formed in the second electrode 270 such that an opening 23 is formed in the light blocking layer 220. The second electrode 270 is an inorganic material including a transparent conductive oxide, and the light blocking layer 220 is an organic material. A laser and the like that is used to form the cut line 271 of the second electrode 270 for prevention of introduction of static electricity also removes the light blocking layer 220 disposed below the second electrode 270. When the light blocking layer 220 is also removed as shown in FIG. 2, light leakage through an area where the light blocking layer 220 is removed occurs.

However, in the LCD according to the exemplary embodiment of the present inventive concept, the light blocking layer 220 is formed after forming the second electrode 270 having the cut line 271, such that the light blocking layer 220 is not damaged when the second electrode 270 is cut. Accordingly, introduction of static electricity can be effectively prevented without causing light leakage due to damage to the light blocking layer 220.

Figure 3:
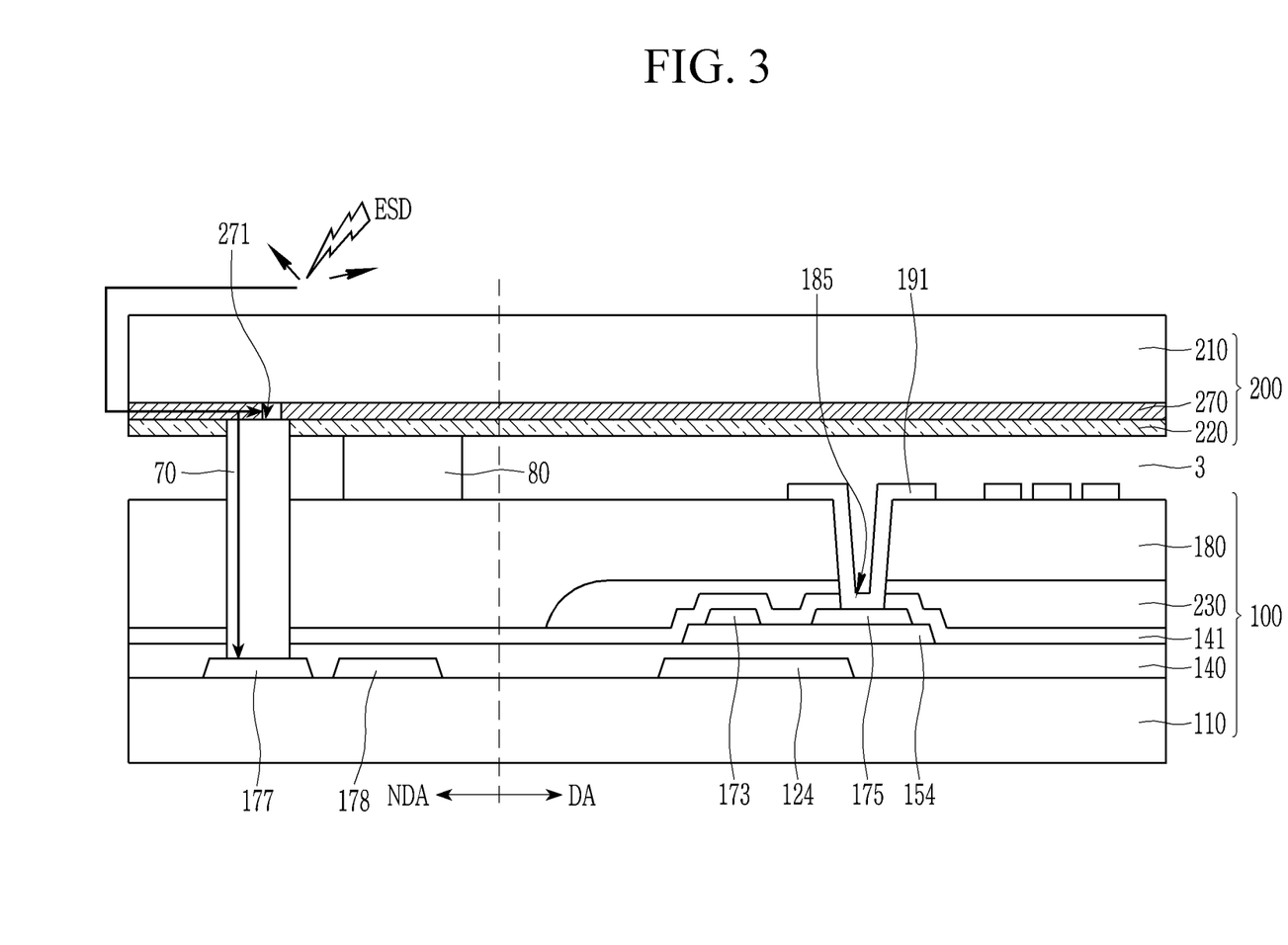
FIG. 3 shows a cross-section of the LCD according to the exemplary embodiment of FIG. 1 in detail.

FIG. 3 is a detailed cross-sectional view of the LCD according to the exemplary embodiment of FIG. 1. Referring to FIG. 3, the LCD includes the first display panel 100 and the second display panel 200 that face each other, and the liquid crystal layer 3 that is disposed between the first display panel 100 and the second display panel 200.

First, the display area DA will be described.

A gate electrode 124, a common voltage transmission line 177, and a clock signal line 178 are disposed in the first substrate 110. A gate insulation layer 140 is disposed on the gate electrode 124, the common voltage transmission line 177, and the clock signal line 178, and a semiconductor layer 154 is disposed on the gate insulation layer 140 while overlapping the gate electrode 124. A source electrode 173 and a drain electrode 175 are disposed on the semiconductor layer 154. A passivation layer 141 is disposed on the source electrode 173 and the drain electrode 175. The passivation layer 141 may be omitted.

A color filter 230 is disposed on the passivation layer 141. An insulation layer 180 is disposed on the color filter 230, and the insulation layer 180 and the color filter 230 have a contact hole 185 that exposes the drain electrode 175. A first electrode 191 is disposed in the insulation layer 180, and the first electrode 191 contacts the drain electrode 175 through the contact hole 185. However, this is an example, and the color filter 230 may be disposed in the second substrate 210 depending on exemplary embodiments.

A second electrode 270 is disposed on the second substrate 210, and a light blocking layer 220 is disposed on the second electrode 270.

Hereinafter, the non-display area NDA will be described. The gate insulation layer 140, the passivation layer 141, and the insulation layer 180 which overlap the common voltage transmission line 177 in the first display panel 100 are removed such that the common voltage transmission line 177 is exposed.

Similarly, the light blocking layer 220 at a location that overlaps the common voltage transmission line 177 in the second display panel 220 is removed such that the second electrode 270 is exposed.

A short-circuit spacer 70 is disposed between the common voltage transmission line 177 and the second electrode 270. The short-circuit spacer 70 contacts the common voltage transmission line 177 and the second electrode 270, and thus transmits a common voltage transmitted from the common voltage transmission line 177 to the second electrode 270.

The second electrode 270 is partially removed and thus a cut line 271 is formed. In FIG. 3, as shown by the arrows, electrostatic discharge (ESD) introduced from the outside is prevented from introduced in the display area DA by the cut line 271, thereby preventing the ESD from being transmitted to the display area DA.

In addition, the ESD is partially transmitted to the common voltage transmission line 177 through the short-circuit spacer 70 and thus the ESD can be dispersed.

A column spacer 80 is disposed to overlap the clock signal line 178. The column spacer 80 may maintain a cell gap of a liquid crystal layer. However, this is an example, and the column spacer 80 may be omitted. In addition, the column spacer 80 may be disposed without overlapping the clock signal line 178.

As described, when the second electrode 270 is disposed between the light blocking layer 200 and the second substrate 210, the light blocking layer 220 can be prevented from being damaged during a process for forming the cut line 217 for prevention of introduction of the ESD, thereby preventing occurrence of light leakage. In addition, a distance between the clock signal line 178 and the second electrode 270 is longer than the comparative example. This is because the light blocking layer 220 is disposed between the clock signal line 178 and the second electrode 270. Thus, capacitance between the clock signal line 178 and the second electrode 270 can be reduced.

In addition, even in the display area DA, the distance between the gate line and the second electrode 270 is greater than that in the conventional comparative example. Thus, capacitance between the gate line and the second electrode 270 in an area other than the opening in the display area DA is reduced.

In addition, the column spacer 80 needs to be non-conductive, but when a metallic impurity is included in the column spacer 80 during the forming process, the first display panel 100 and the second display panel 200 may be short-circuited. However, in the present exemplary embodiment, the column spacer 80 does not contact the second electrode 270 but contacts the light blocking layer 220. Thus, even if a metallic impurity is included in the column spacer 80 during the forming process, the first display panel 100 and the second display panel 200 can be prevented from being short-circuited to each other.

Figure 4:
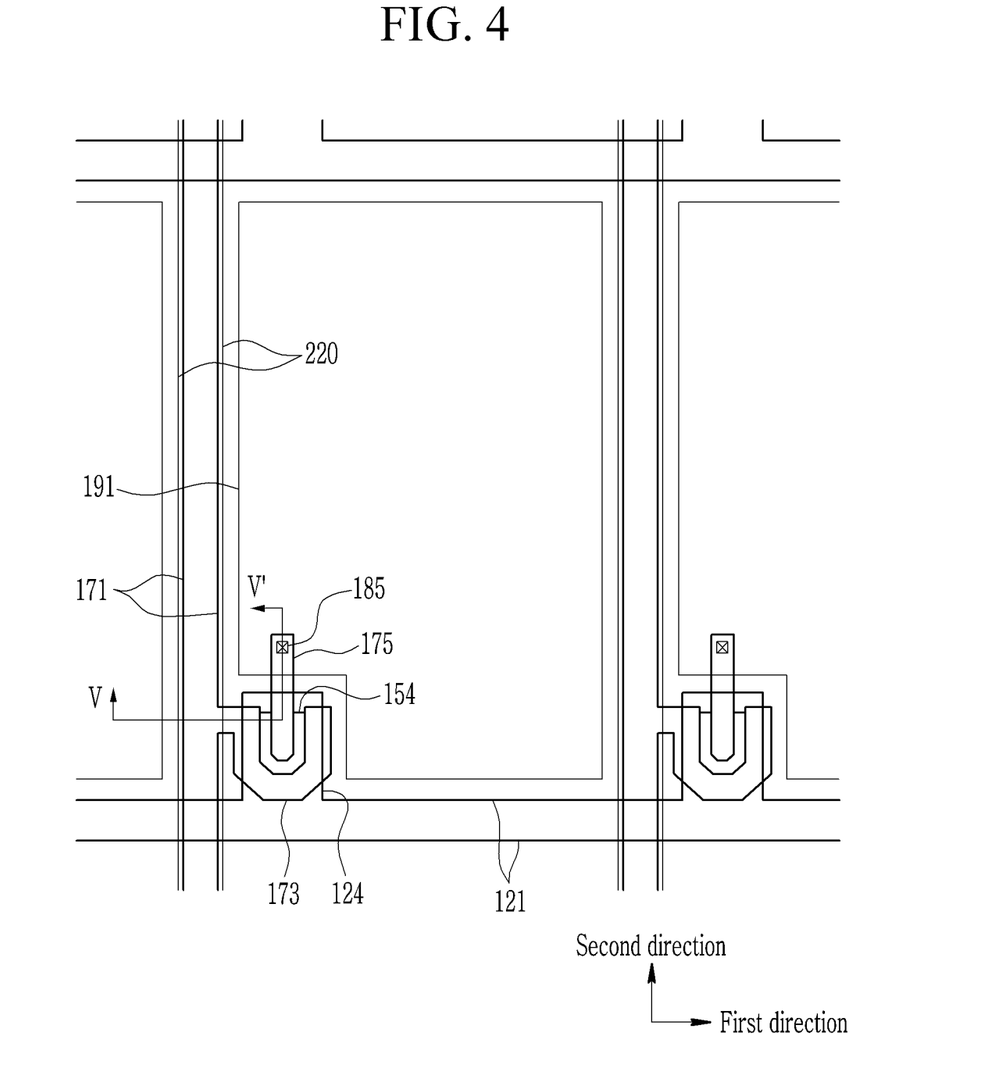
FIG. 4 is a layout view of a display according to an exemplary embodiment of the present inventive concept.
Figure 5:
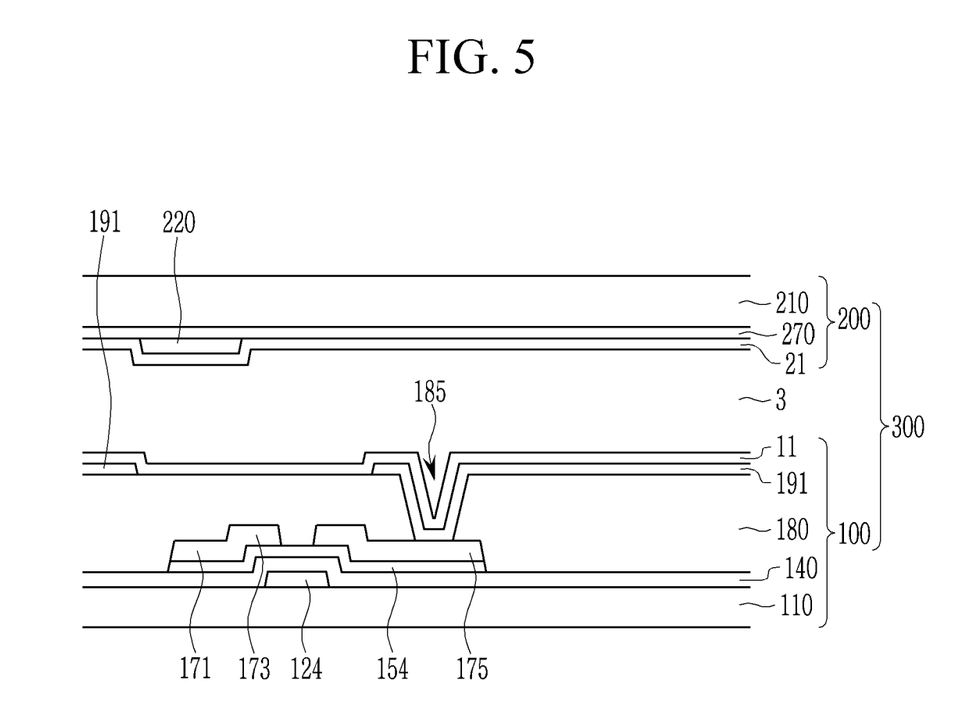
FIG. 5 is a cross-sectional view of the display FIG. 4, taken along the line V-V'.

Next, a pixel structure of a display area DA of a display according to an exemplary embodiment of the present inventive concept will be described in detail. FIG. 4 is a layout view of a display device according to an exemplary embodiment of the present inventive concept, and FIG. 5 is a cross-sectional view of FIG. 4, taken along the line V-V'.

A display device 300 includes a first display panel 100, a second display panel 200 that overlaps the first display panel 100, and a liquid crystal layer 3 that is disposed between the first display panel 100 and the second display panel 200.

The first display panel 100 will now be described. A gate conductor that includes a gate line 121 and a gate electrode 124 is disposed on one side of a first substrate 110 that is made of transparent glass or plastic.

The gate line 121 may extend in a first direction. The gate conductor may include various metals or conductors, and may have a multilayered structure. A gate insulation layer 140 is disposed between the gate conductor and the liquid crystal layer 3. The gate insulating layer 140 may include an inorganic insulating material.

A semiconductor layer 154 is disposed on one side of the gate insulation layer 140.

The data line 171 is disposed between the semiconductor layer 154 and the liquid crystal layer 3, and extends in a second direction to cross the gate line 121. The source electrode 173 extends from the data line 171 and may overlap the gate electrode 124. The drain electrode 175 is separated from the data line 171, and as shown in FIG. 4, the drain electrode 175 may have a shape that extends toward the center of the source electrode 173.

A part of the semiconductor layer 154 may not overlap the data line 171 and the drain electrode 175 in a region between the source electrode 173 and the drain electrode 175. The semiconductor layer 154 may have substantially the same planar shape as that of the data line 171 and the drain electrode 175 except for such a non-overlapping portion.

One gate electrode 124, one source electrode 173, and one drain electrode 175 form one thin film transistor, together with the semiconductor layer 154, and a channel of the thin film transistor is a region of the semiconductor layer 154 disposed between the source electrode 173 and the drain electrode 175.

A passivation layer 180 is disposed between the source electrode 173 and drain electrode 175, and the liquid crystal layer 3. The passivation layer 180 may include an inorganic insulation material such as a silicon nitride or a silicon oxide, an organic insulation material, or a low dielectric insulation material.

The passivation layer 180 includes a contact hole 185 which partially overlaps the drain electrode 175.

A first electrode 191 is disposed between the passivation layer 180 and the liquid crystal layer 3. The first electrode 191 is physically and electrically connected with the drain electrode 175 through the contact hole 185, and receives a data voltage from the drain electrode 175. The first electrode 191 may be a pixel electrode.

A first alignment layer 11 is disposed between the first electrode 191 and the liquid crystal layer 3.

The second display panel 200 includes a second substrate 210, a second electrode 270, a light blocking layer 220, and a second alignment layer 21.

The second electrode 270 is disposed at one side of the second substrate 210. The second electrode 270 may be a common electrode.

The light blocking layer 220 is disposed on the second electrode 270. The light blocking layer 220 overlaps the data line 171 and thus may extend in the second direction. Although it is not illustrated, the light blocking layer 220 may further include a horizontal portion that overlaps the gate line 121 and extends in the first direction. The second alignment layer 21 is disposed between the second electrode 270 and the liquid crystal layer 3.

However, the above-stated structure is an example, and the pixel structure of the display area DA is not limited thereto.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:
1. A liquid crystal display comprising:
a first substrate including a first electrode;
a second substrate including a second electrode and a light blocking layer; and
a conductive short-circuit spacer that is disposed between the first substrate and the second substrate,
wherein the second electrode is disposed between the second substrate and the light blocking layer, the light blocking layer includes an opening, and
the second electrode and the conductive short-circuit spacer contact each other in the opening,
wherein the second electrode includes a cut line which is a disconnected portion of the second electrode and is disposed in a non-display area,
wherein the cut line is disposed to overlap the conductive short-circuit spacer which electrically connects the second electrode and a common voltage transmission line disposed on the first substrate, and
wherein the second substrate comprises a display area and a non-display area, the conductive short-circuit spacer is disposed in the non-display area, and the cut line is disposed farther away from the display area than the conductive short-circuit spacer.

2. The liquid crystal display of claim 1, wherein the first substrate comprises a display area and the non-display area, and the common voltage transmission line is disposed in the non-display area of the first substrate and contacts the conductive short-circuit spacer.

3. The liquid crystal display of claim 2, wherein a voltage supplied to the common voltage transmission line is transmitted to the second electrode through the conductive short-circuit spacer.

4. The liquid crystal display of claim 1, further comprising a column spacer that is disposed in the non-display area between the first substrate and the second substrate.

5. The liquid crystal display of claim 4, wherein the column spacer contacts the light blocking layer.

6. The liquid crystal display of claim 4, wherein the column spacer does not contact the second electrode.

7. A liquid crystal display comprising:
a first substrate that includes a first electrode; and
a second substrate that includes a second electrode and a light blocking layer,
wherein the second electrode is disposed between the second substrate and the light blocking layer, the second substrate includes a display area and a non-display area, the light blocking layer disposed in the non-display area includes an opening, and the second electrode disposed in the non-display area includes a cut line which is a disconnected portion of the second electrode,
wherein the cut line is disposed to overlap a conductive short-circuit spacer which electrically connects the second electrode and a common voltage transmission line disposed on the first substrate, and
wherein the cut line is disposed farther away from the display area than the conductive short-circuit spacer.

8. The liquid crystal display of claim 7, wherein the conductive short-circuit spacer is disposed in the non-display area between the first substrate and the second substrate, and the second electrode and the conductive short-circuit spacer contact each other in the opening.

9. The liquid crystal display of claim 8, wherein the first substrate comprises a display area, and a non-display area, and the common voltage transmission line is disposed in the non-display area of the first substrate and contacts the conductive short-circuit spacer.

10. The liquid crystal display of claim 9, wherein a voltage supplied to the common voltage transmission line is transmitted to the second electrode through the conductive short-circuit spacer.

11. The liquid crystal display of claim 7, further comprising a column spacer that is disposed in the non-display area between the first substrate and the second substrate.

12. The liquid crystal display of claim 11, wherein the column spacer contacts the light blocking layer.

13. The liquid crystal display of claim 11, wherein the column spacer does not contact the second electrode.

14. The liquid crystal display of claim 11, further comprising a clock signal line that is disposed in the non-display area of the first substrate,
   wherein the clock signal line is disposed to overlap the column spacer.

\* \* \* \* \*